(12) United States Patent  
Bodin et al.

(10) Patent No.: US 7,406,439 B2  
(45) Date of Patent: Jul. 29, 2008

(54) INVENTORY CONTROLS WITH RADIO FREQUENCY IDENTIFICATION

(75) Inventors: William Kress Bodin, Austin, TX (US); Derral Charles Thorson, Austin, TX (US); Parag Himanshu Shah, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 10/062,325

(22) Filed: Jan. 31, 2002

(65) Prior Publication Data

US 2003/0144926 A1 Jul. 31, 2003

(51) Int. Cl.  
*G06G 1/14* (2006.01)  
*G06Q 20/00* (2006.01)

(52) U.S. Cl. ............... 705/22; 705/23; 705/24; 705/28; 700/225; 340/572.1

(58) Field of Classification Search ............... 705/22, 705/23, 24, 28; 700/225; 340/572.1  
See application file for complete search history.

(56) References Cited

U.S. PATENT DOCUMENTS

| | | | | |
|---|---|---|---|---|
| 4,688,026 A | * | 8/1987 | Scribner et al. | 235/385 |
| 4,961,533 A | * | 10/1990 | Teller et al. | 177/25.19 |
| 5,382,784 A | * | 1/1995 | Eberhardt | 235/462.46 |
| 5,548,110 A | * | 8/1996 | Storch et al. | 235/462.07 |
| 5,589,821 A | * | 12/1996 | Sallen et al. | 340/573.4 |
| 5,595,356 A | * | 1/1997 | Kewin | 242/613.5 |
| 5,640,002 A | * | 6/1997 | Ruppert et al. | 235/462.46 |
| 5,745,754 A | | 4/1998 | Lagarde et al. | 707/104 |
| 5,751,909 A | | 5/1998 | Gower | 706/45 |
| 5,796,950 A | | 8/1998 | Sips et al. | 709/218 |
| 5,798,694 A | * | 8/1998 | Reber et al. | 340/540 |
| 5,845,264 A | | 12/1998 | Nellhaus | 705/28 |
| 5,918,053 A | | 6/1999 | Graham | 717/4 |
| 5,963,134 A | * | 10/1999 | Bowers et al. | 340/572.1 |
| 5,966,082 A | * | 10/1999 | Cofino et al. | 340/10.51 |
| 6,087,930 A | * | 7/2000 | Kulka et al. | 340/447 |
| 6,094,655 A | | 7/2000 | Rogers et al. | 707/10 |
| 6,097,301 A | * | 8/2000 | Tuttle | 340/693.9 |
| 6,102,162 A | * | 8/2000 | Teicher | 186/39 |

(Continued)

OTHER PUBLICATIONS

White, Ron, How Computers Work, Millennium Ed. Que Corporation, Sep. 1999.*

(Continued)

*Primary Examiner*—F. Zeender  
*Assistant Examiner*—Christopher Buchanan  
(74) *Attorney, Agent, or Firm*—H. Artoush Ohanian; Libby Z. Handelsman; Biggers & Ohanian, LLP

(57) ABSTRACT

Inventory control with inventory item attributes wherein the attributes describe an inventory item, the inventory item has an RFID identification tag having an RFID identification tag code, and the inventory item attributes include an RFID identification tag code field, a control value, an acceptable control value range, and an out of range action. Detecting changes in the inventory item attributes, including reading, through an RFID reader, the RFID identification code from the RFID tag associated with the inventory item, recording detected changes in inventory item attributes, comparing the control value and the acceptable control value range, and taking action in dependence upon the result of the comparing and the out of range action.

9 Claims, 11 Drawing Sheets

U.S. PATENT DOCUMENTS

| | | | | |
|---|---|---|---|---|
| 6,128,620 | A | 10/2000 | Pissanos et al. | 707/102 |
| 6,173,404 | B1 | 1/2001 | Colburn et al. | 713/200 |
| 6,188,570 | B1 | 2/2001 | Borkowski | 361/683 |
| 6,192,364 | B1 | 2/2001 | Baclawski | 707/10 |
| 6,204,763 | B1* | 3/2001 | Sone | 340/568.1 |
| 6,232,876 | B1* | 5/2001 | Maloney | 340/568.1 |
| 6,327,576 | B1* | 12/2001 | Ogasawara | 705/22 |
| 6,349,244 | B1* | 2/2002 | Bardin et al. | 700/231 |
| 6,357,662 | B1* | 3/2002 | Helton et al. | 235/462.45 |
| 6,362,738 | B1* | 3/2002 | Vega | 340/572.1 |
| 6,415,978 | B1* | 7/2002 | McAllister | 235/462.01 |
| 6,430,541 | B1* | 8/2002 | Brown et al. | 705/28 |
| 6,450,406 | B2* | 9/2002 | Brown | 235/462.45 |
| 6,450,411 | B1* | 9/2002 | Rash et al. | 236/44 A |
| 6,488,099 | B2* | 12/2002 | McSheffrey et al. | 169/60 |
| 6,542,933 | B1* | 4/2003 | Durst et al. | 709/229 |
| 6,557,758 | B1* | 5/2003 | Monico | 235/380 |
| 6,593,845 | B1* | 7/2003 | Friedman et al. | 340/10.33 |
| 6,708,879 | B2* | 3/2004 | Hunt | 235/385 |
| 6,758,397 | B2* | 7/2004 | Catan | 235/385 |
| 6,758,403 | B1* | 7/2004 | Keys et al. | 235/462.45 |
| 6,763,996 | B2* | 7/2004 | Rakers et al. | 235/375 |
| 6,819,222 | B2* | 11/2004 | Lin et al. | 340/10.31 |
| 6,829,520 | B1* | 12/2004 | Green | 700/225 |
| 2001/0051905 | A1* | 12/2001 | Lucas | 705/29 |
| 2002/0038267 | A1* | 3/2002 | Can et al. | 705/28 |
| 2002/0077937 | A1* | 6/2002 | Lyons et al. | 705/28 |
| 2002/0138355 | A1* | 9/2002 | Briggs et al. | 705/26 |
| 2003/0034390 | A1* | 2/2003 | Linton et al. | 235/382 |
| 2003/0135417 | A1* | 7/2003 | Bodin | 705/16 |

OTHER PUBLICATIONS

Derfler, Frank J. et. al. How Networks Work, Millennium Ed., Que Corporation, Jan. 2000.*

Gralla, Preston, How the Internet Works, Millennium Ed., Que Corporation, Aug. 1999.*

Muller, Nathan J., Desktop Encyclopedia of the Internet, Artech House, Inc., 1998.*

Borland's Paradox for Windows User's Guide, Borland International, Inc. 1994.*

Riley, David D., Data Abstraction and Stucture, An Introduction to Computer Science II, Boyd and Fraser Publishing Company, 1987.*

Greene, James H., Editor-in-Chief, Production and Inventory Control Handbook, 3rd Ed., The McGraw-Hill Companies, Inc., 1997.*

Dobler, Donald W. and Burt, David N., Purchasing and Supply Management, Text & Cases, 6th Ed., The McGraw-Hill Companies, Inc., 1996.*

White, Ron, How Computers Work, 6th Ed., Que Corporation, Sep. 10, 2001.*

Gralla, Preston, How the Internet Works, 6th Ed., Que Corporation, Sep. 7, 2001.*

Poirier, Charles C., et. al. E-Supply Chain, Using the Internet to Revolutionize Your Business, Berrett-Koehler Publisher, Inc, 2000.*

* cited by examiner

| Item ID 302 | Description 304 | Tag ID 306 | CV 308 | CV Unit 310 | ACVR 312 | OOR Action 314 | Inv. Date 316 |
|---|---|---|---|---|---|---|---|
| 318 | Tea Bags | 342 | 23 | Count | 5-100 | Reorder | |
| 320 | Peanut Butter | 344 | 75 | Freshness | 50-100 | Reorder | |
| 324 | Mayonnaise | 346 | 10 | Utilization | 0-25 | Reorder | |
| 326 | Leftover Pot Roast | 348 | 3 | Days | 0-7 | Discard | |
| 328 | Bread | 350 | 5 | Days | 0-10 | Reorder | 01/02/01 |
| 330 | Milk | 352 | 75 | Freshness | 50-100 | Reorder | |
| 332 | Cheddar Cheese | 354 | 5 | Days | 0-20 | Reorder | 01/02/01 |
| 334 | Hamburger Meat | 356 | 0.8 | Pounds | 0.5-1.5 | Reorder | |
| 336 | Granola | 358 | 0.7 | Pounds | 0.3-1.0 | Reorder | |
| 338 | Green Beans | 360 | 0.5 | Pounds | 0.3-1.0 | Reorder | |
| 340 | Broccoli | 362 | 0.6 | Pounds | 0.3-1.0 | Reorder | |

Inventory Item Attributes ~ 300

Figure 3

INVENTORY CONTROLS WITH RADIO FREQUENCY IDENTIFICATION

BACKGROUND OF THE INVENTION

1. Field of the Invention

The field of the invention is inventory controls with radio frequency identification.

2. Description of the Related Art

Bar code readers provide to computers data identifying inventory items bearing bar codes. Inventory items bearing bar codes, for use of a bar code, must be in close physical proximity to a bar code reader, must be correctly oriented in space with respect to the bar code reader, and must be physically moved with respect to a scanning element of the bar code reader. Only one bar code at a time can be scanned by a bar code reader. Bar codes typically supply no information other than the bare identity of an item associated with a bar code. It would be advantageous, therefore, to have methods and systems that are capable of sensing the identity of inventory items, sensing also other characteristics or attributes of inventory items, and taking action related to inventory control on the basis of that information.

SUMMARY OF THE INVENTION

Exemplary embodiments of the invention include a method of inventory control, typically including providing inventory item attributes comprising data elements in computer memory, wherein the inventory item attributes describe an inventory item, the inventory item has an RFID identification tag having an RFID identification tag code, and the inventory item attributes typically include an RFID identification tag code field, a control value, an acceptable control value range, and an out of range action. Some exemplary embodiments include detecting changes in the inventory item attributes, wherein detecting changes in inventory item attributes includes reading, through an RFID reader, the RFID identification code from the RFID tag associated with the inventory item, recording detected changes in inventory item attributes, comparing the control value and the acceptable control value range, and taking action in dependence upon the result of the comparing and the out of range action. In exemplary embodiments, the steps of detecting changes, recording detected changes, comparing the control value and the acceptable control value range, and taking action are typically carried out through Java servlets in at least one OSGI-compliant service bundle installed and operating in an OSGI-compliant service gateway.

In an exemplary embodiment of the invention, the inventory item attributes include a control value unit field set to 'pounds'. In such an embodiment, detecting changes includes reading the weight of the inventory item from a scale, and recording detected changes typically includes storing the weight of the inventory item in the control value.

In a further example embodiment, the inventory item attributes include a control value unit field set to 'freshness'. In such an embodiment, detecting changes in the inventory attributes of the inventory item typically includes reading from a clock the time when the inventory item is removed from a refrigerator, reading the temperature from a kitchen thermometer, reading from the clock the time when the inventory item is returned to the refrigerator, and calculating a freshness coefficient in dependence upon the time when removed, the time when returned, and the temperature. In this example embodiment recording detected changes includes storing the freshness coefficient in the control value.

In a still further example embodiment, the inventory item attributes include a control value unit field set to 'utilization'. In this example, detecting changes in the inventory attributes of the inventory item includes detecting that the inventory item has been removed from and returned to an inventory storage location, and recording detected changes typically includes incrementing the control value, wherein the control value represents the number of times the inventory item has been utilized.

In an additional example, the inventory item includes a quantity of separate items and the inventory item attributes include a control value unit field set to 'count'. In such an embodiment, detecting changes in the inventory attributes includes detecting that one of the separate items has been removed from inventory and recording detected changes includes decrementing the control value, wherein the control value represents the quantity of separate items.

In other exemplary embodiments the inventory item attributes typically include a control value unit field set to 'days', and an inventory date representing the date when the inventory item entered inventory. In such embodiments, detecting changes typically includes reading from a clock the current date, and calculating the age of the inventory item in dependence upon the current date and the inventory date. In such embodiments recording detected changes typically includes storing the age of the inventory item in the control value.

In other exemplary embodiments taking action includes emailing an order to a vendor to reorder the inventory item when the control value is outside the acceptable control value range. In other examples, taking action includes emailing a message to a user advising the user to discard the inventory item when the control value is outside the acceptable control value range. In still other examples, taking action includes sending, through HTTP and through a vendor service gateway directly to a vendor's online order system, an HTML order for the inventory item when the control value is outside the acceptable control value range.

The foregoing and other objects, features and advantages of the invention will be apparent from the following more particular description of exemplary embodiments of the invention, as illustrated in the accompanying drawings wherein like reference numbers represent like parts of the invention.

BRIEF DESCRIPTION OF THE DRAWINGS

FIG. 3 is a diagram of a data structure useful in various embodiments of the present invention to represent inventory items.

DETAILED DESCRIPTION OF EXEMPLARY EMBODIMENTS

Introduction

Figure 1:
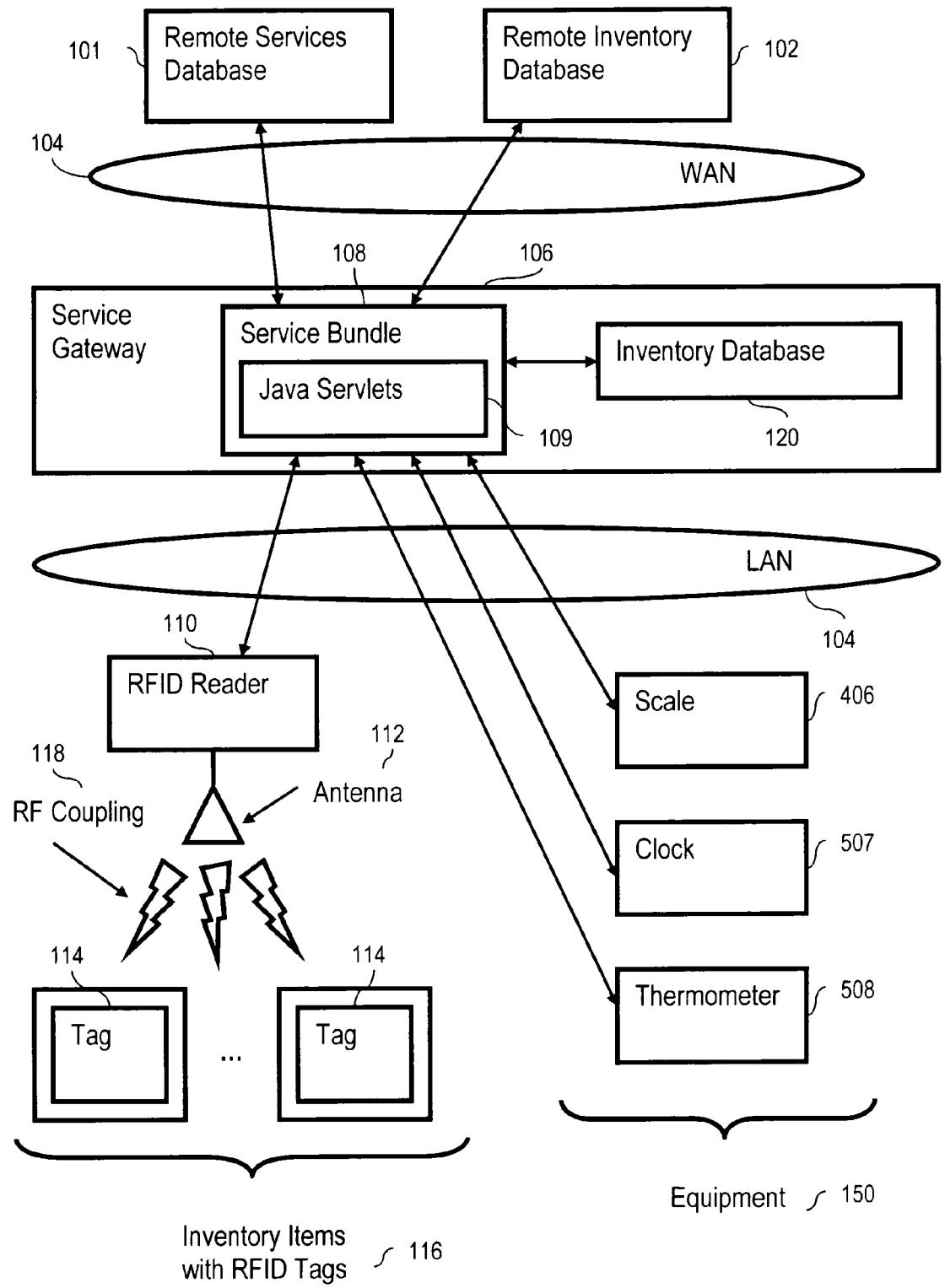
FIG. 1 is an overview block diagram illustrating typical exemplary embodiments of the present invention.

The present invention is described primarily in terms of methods for inventory controls with radio frequency identification. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the following terms are used as defined here. Other terms are defined elsewhere in the specification and used as defined.

In this specification, the terms "memory variable," "field," "data element," "attribute," and "code" refer to individual elements of digital data. Aggregates of data elements are referred to as "records" or "data structures." Definitions of complex data structures that include member methods, functions, or software routines in addition to data elements are referred to as "classes." Instances of complex data structures are referred to as "objects" or "class objects."

"Coupled for data communications" means any form of data communications, wireless, 802.11b, Bluetooth, infrared, radio, internet protocols, HTTP protocols, email protocols, networked, direct connections, dedicated phone lines, dial-ups, serial connections with RS-232 (EIA232) or Universal Serial Buses, hard-wired parallel port connections, network connections according to the Power Line Protocol, and other forms of data communications as will occur to those of skill in the art.

The term "network" is used in this specification to mean any networked coupling for data communications. Examples of networks useful with the invention include intranets, extranets, internets, local area networks, wide area networks, and other network arrangements as will occur to those of skill in the art. The use of any networked coupling among service gateways, RFID readers, local interactions databases, and remote interactions databases coupled through designated network addresses is well within the scope of the present invention.

"Network address" means any network address useful to locate an RFID reader, a service gateway, a local interactions database, or a remote interactions database on any network. Network addresses include any internet protocol address useful to locate a service gateway, an RFID reader, or a remote interactions database on an internet. Network addresses useful with various embodiments of the invention include local internet protocol addresses, private internet protocol addresses, and temporary Internet addresses assigned to a Web client by a DHCP server, and permanent, official registered Internet addresses associated with domain names.

"URL" means Uniform Resource Locator, a standard method of associating World Wide Web data locations with network addresses for data communications.

"World Wide Web," or more simply "the Web," refers to the well-known system of internet protocol ("IP") servers that support specially formatted documents, documents formatted in a language called "HTML" for HyperText Markup Language. The term "Web" is used in this specification also to refer to any server or connected group or interconnected groups of servers that implement the HyperText Transport Protocol, "HTTP," in support of URLs and HTML documents, regardless whether such servers or groups of servers are coupled to the World Wide Web as such.

"Browser" means a Web browser, a software application for locating and displaying Web pages. Typical browsers today can display text, graphics, audio and video.

A "Web site" is a location on the World Wide Web. Web sites are identified by domain names that resolve to Internet addresses. Web sites include storage locations identifiable by URLs. Web sites are implemented in, on, and as part of Web servers, that is, HTTP servers. Web sites are aggregations of computer software installed and operating on computer hardware.

DETAILED DESCRIPTION

Turning now to FIG. 1, a first embodiment of the invention is shown as a system for inventory control for inventory items having RFID tags. "RFID" means Radio Frequency Identification, a technology for identifying objects by use of an antenna, a transceiver, and a transponder. RFID transceivers, in this specification, are referred to as "RFID readers." As the term 'transceiver' implies, however, RFID readers both read and write information to and from RFID transponders. RFID transponders are referred to in this specification as "RFID tags." RFID tags are programmed with RFID identification codes unique to each RFID tag. In addition, RFID tags are programmed in some embodiments with other information in addition to RFID identification codes, such as, for example, inventory item type codes, location codes, inventory dates, control values, and so on.

In typical embodiments, an RFID antenna (112) emits radio signals (118) to activate an RFID tag (114) and read and write data to and from the tag. Antennas act as data conduits, part of a coupling for data communications, between tags and transceivers or RFID readers. Antennas are available in a variety of shapes and sizes. Antennas in some embodiments are built into door frames to receive tag data from objects passing through doors or mounted on interstate toll booths to monitor traffic passing by on a freeway. In some embodiments, where multiple tags are expected continually, the electromagnetic field produced by an antenna is constantly present. If constant interrogation is not required, the electromagnetic field in many embodiments is activated by sensors.

Often an antenna (112) is packaged with an RFID reader (110), which is configured in various embodiments as a handheld or as a fixed-mount device. An RFID reader (110) in typical embodiments emits radio waves in ranges of anywhere from one inch to 100 feet or more, depending upon its power output and the radio frequency used. When an RFID tag (114) passes through the electromagnetic field of a radio signal from an RFID antenna, the RFID tag detects the reader's activation signal. The reader decodes the data encoded in the tag's integrated circuit (silicon chip) and the data is passed to a service gateway (106) for processing.

In the system as illustrated in FIG. 1, the service gateway (106) is a host server, server software installed and running on server computer hardware. In many embodiments, the service gateway is a home or business server, that is, a separate computer coupled for data communications through a network to an RFID reader. In typical embodiments, the services gateway is an embedded server inserted in a network to connect the external internet to internal client devices within a home, office, or business setting. Client devices include RFID readers. In some embodiments, the service gateway is an embedded server installed and running in the same physical device or cabinet with the RFID reader.

"Embedded servers" typically are Java embedded servers, small-footprint application serves that can be embedded in any networked device, such as a home gateway, automobile, vending machine, cash register, gas pump, or RFID reader. Embedded servers typically are zero-administration devices intended, when implemented as service gateways, to divide a network architecture into an external network and an internal network. An embedded server manages service deployed from trusted external resources to internal client devices over a network, including for example, services implemented through OSGI-compliant service bundles. Embedded servers enable deployment and installation of services, such as OSGI-compliant service bundles, on a just-in-time basis, when the services are needed from time to time for use by client devices, such as, for example, RFID readers.

"OSGI" refers to the Open Services Gateway Initiative, an industry organization developing specifications for service gateways, including specifications for delivery of service bundles, software middleware providing compliant data communications and services through service gateways. The Open Services Gateway specification is a java based application layer framework that gives service providers, network operator device makers, and appliance manufacturer's vendor neutral application and device layer APIs and functions. An "API" is an Application Program Interface, a set of routines, protocols, and tools for building software applications.

RFID tags come in a wide variety of shapes and sizes. Animal tracking tags, inserted beneath the skin, can be as small as a pencil lead in diameter and one-half inch in length. Some tags are screw-shaped to identify trees or wooden items, or credit-card shaped for use in access applications. The anti-theft hard plastic tags attached to merchandise in stores are RFID tags. In addition, heavy-duty 5- by 4- by 2-inch rectangular transponders used to track intermodal containers or heavy machinery, trucks, and railroad cars for maintenance and tracking applications are RFID tags.

RFID tags are categorized as either active or passive. Active RFID tags are powered by an internal battery and are typically read/write, i.e., tag data can be rewritten and/or modified. An active tag's memory size varies according to application requirements; some systems operate with up to 1 MB of memory. In a typical read/write RFID work-in-process system, a tag might give a machine a set of instructions, and the machine would then report its performance to the tag. This encoded data would then become part of the tagged part's history. The battery-supplied power of an active tag generally gives it a longer read range. The trade off is greater size, greater cost, and a limited operational life (which may yield a maximum of 10 years, depending upon operating temperatures and battery type).

Passive RFID tags operate without a separate external power source and obtain operating power generated from the RFID reader. Passive tags are consequently much lighter than active tags, less expensive, and offer a very long operational lifetime. The trade off is that passive RFID tags have shorter read ranges than active tags and require a higher-powered reader. Some passive are programmed with a unique set of data (usually 32 to 128 bits) that cannot be modified. Read-only tags most often operate as a license plate or index into a database, in the same way as linear barcodes reference a database containing modifiable product-specific information.

The inventory items (116) of FIG. 1 are said to "have" RFID tags, by which is meant a close physical proximity. The RFID tags may or may not be physically attached to the inventory items, as, for example, the case of drugs in which pills are stored in a pill container where the container rather than the pills has the RFID tag affixed, although the pills are considered the inventory items of interest.

In the method aspects of the present invention, steps of methods are typically carried out by use of Java servlets (109) in OSGI-compliant service bundles (108). Service gateways (106) often download service bundles (108) remotely across WANs (104), such as, for example, the Internet, from remote services databases (101), thus reducing the memory overheads for the service gateways, which as mentioned above, are typically small footprint, low overhead installations.

Inventory item attributes are typically stored in inventory databases. In some embodiments, an inventory database (120) is implemented in a service gateway or at least in the same local system with a service gateway. In other embodiments, inventory databases are located and accessed remotely (102). Inventory databases have data structures such as, for example, the ones illustrated in FIG. 3 and in FIG. 10, discussed in more detail below in this specification.

Typical embodiments of the present invention include equipment useful in inventory control, including for example scales (406), clocks (507), and thermometers (508). In typical embodiments, data communications with inventory control equipment is carried out through Java servlets (109) in service bundles (108) in a service gateway (106). Such data communications in some embodiments is directly coupled; in other embodiments, as shown in FIG. 1, the data communications is carried out through a LAN (104). The LAN in some embodiments is wireless, including for example, wireless LANs effected by use of 802.11b connections or Bluetooth piconets. Such networked (104) couplings for data communications are also used in many embodiments between service gateways (106) and RFID readers (110).

Figure 9:
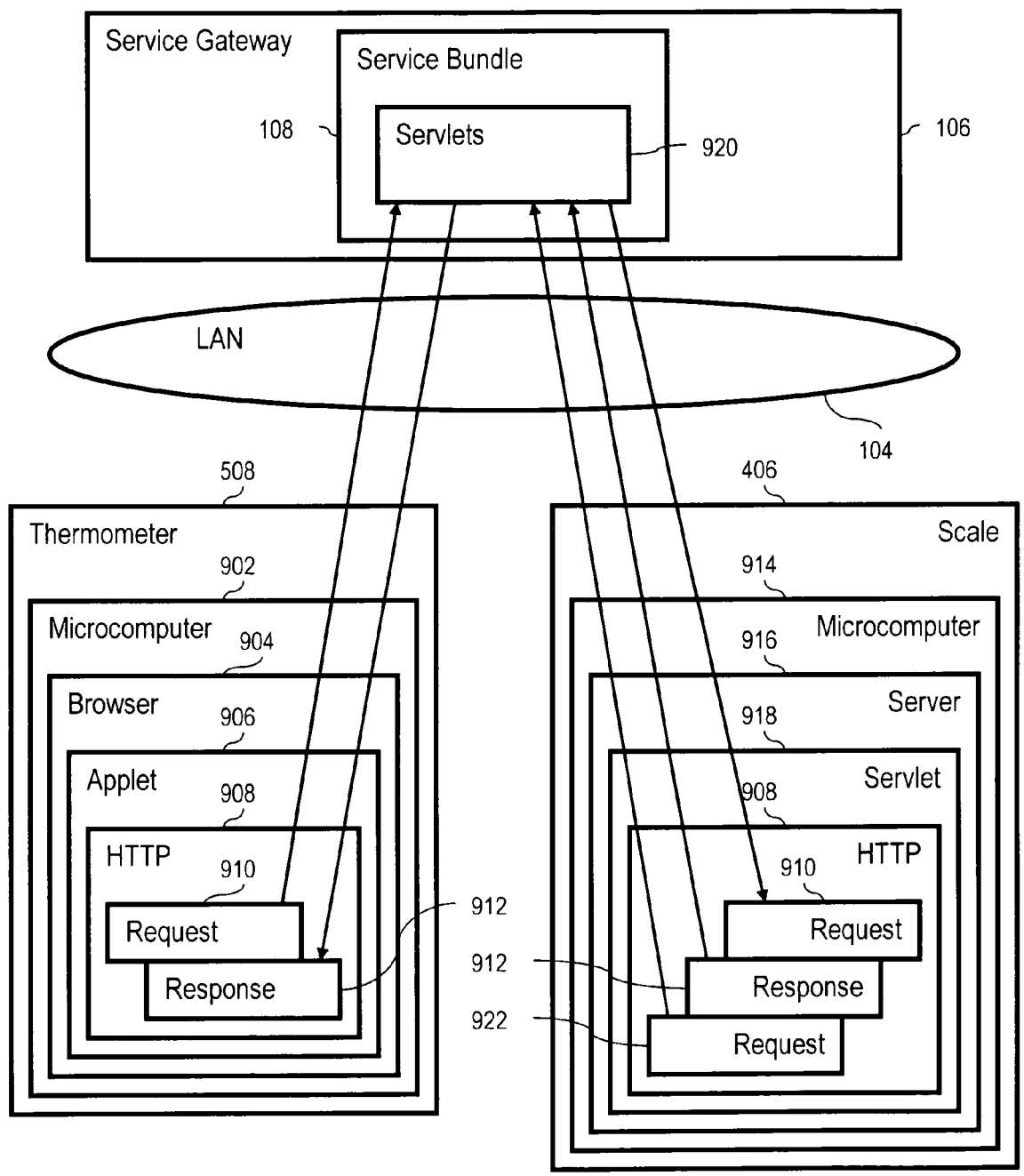
FIG. 9 is a block diagram of exemplary embodiments utilizing browsers and embedded servers to effect data communications among service gateways and networked equipment.

FIG. 9 shows more detailed examples of networked couplings for data communications among inventory control equipment and service gateways. More specifically, FIG. 9 illustrates an embodiment in which data communications are carried out between a service gateway (106) and a thermometer (508) by use of a browser (904) embedded in firmware, for example, in a microcomputer (902) integrated with the thermometer (508). The browser is coupled for data communications through a LAN (104) to the service gateway (106). The browser includes a plug-in or applet (906) programmed to effect HTTP (908) communications with the service gateway by sending HTTP request messages (910) and receiving HTTP response messages (912).

FIG. 9 illustrates a further embodiment in which data communications are carried out between a service gateway (106) and a scale (406) by use of an embedded server (916) embedded in firmware, for example, in a second microcomputer (914) integrated with the scale (406). The server (916) is coupled for data communications through a LAN (104) to the service gateway (106). The server includes a servlet (918) programmed to effect HTTP (908) communications with the service gateway by receiving HTTP request messages (910) and sending HTTP response messages (912). The server is optionally programmed also to send HTTP request message (922).

Figure 2:
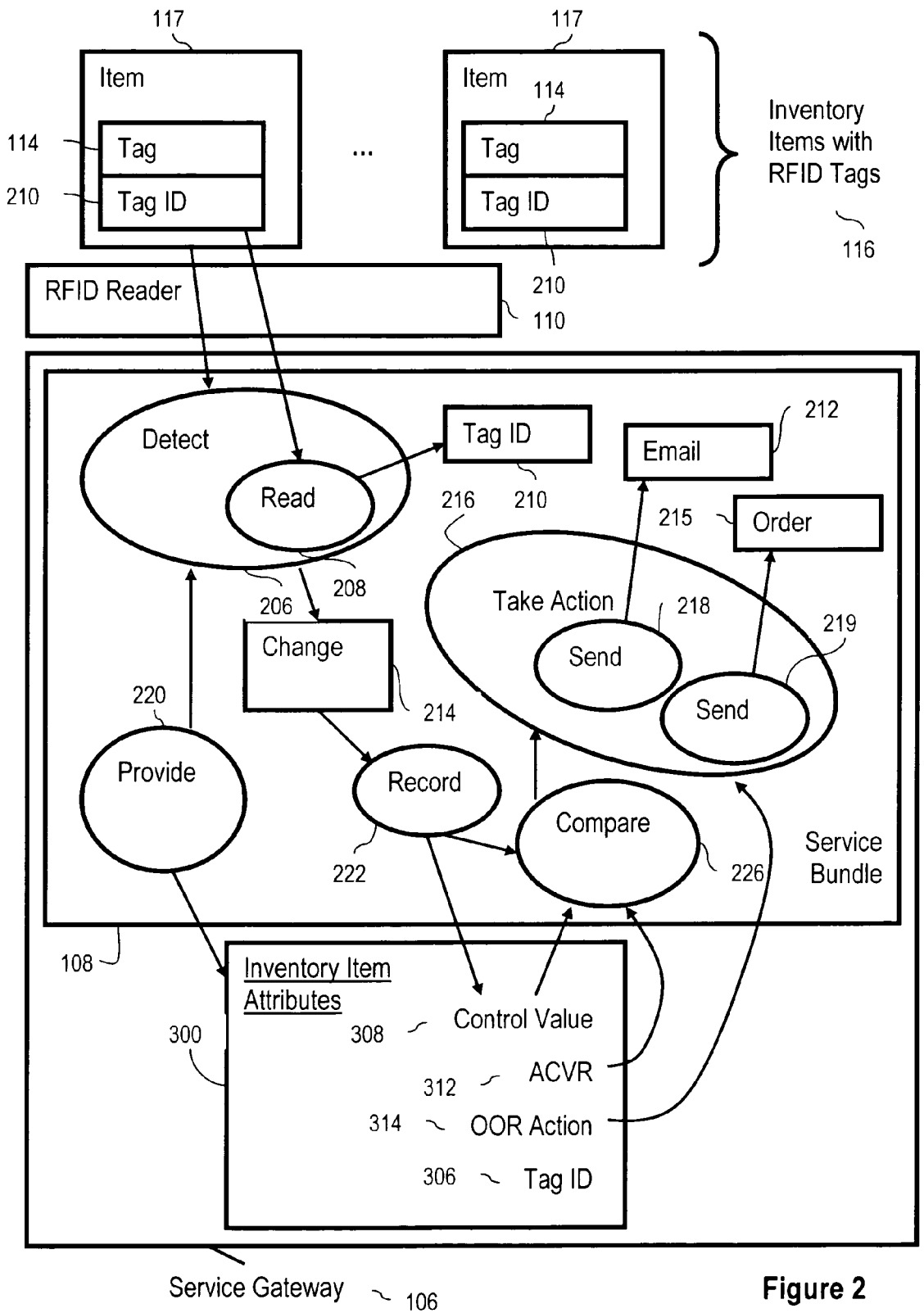
FIG. 2 is an overview control flow diagram illustrating typical exemplary embodiments of the present invention.

Turning now to FIG. 2, a further embodiment of the invention is seen illustrated as a method of inventory control. Typical embodiments include providing (220) inventory item attributes (300) comprising data elements in computer memory, wherein the inventory item attributes describe an inventory item (117) and the inventory item has an RFID identification tag (114) having an RFID identification tag code (210).

Typically, the inventory item attributes include an RFID identification tag code field (306), a control value (308), an acceptable control value range (312), and an out of range action (314). Typical embodiments also include detecting changes (206) in the inventory item attributes, wherein detecting changes in inventory item attributes includes reading (208), through an RFID reader (110), the RFID identification code (210) from the RFID tag associated with the inventory item (117), and recording (222) detected changes in inventory item attributes.

Typical embodiments further include comparing (226) the control value (308) and the acceptable control value range (312), and taking action (216) in dependence upon the result of the comparing and the out of range action (314). In some embodiments, the steps of detecting changes (206), recording detected changes (222), comparing (226) the control value and the acceptable control value range, and taking action (216) are carried out through Java servlets (reference 109 on FIG. 1) in at least one OSGI-compliant service bundle (108) installed and operating in an OSGI-compliant service gateway (106).

FIG. 3 is used to illustrate aspects of inventory item attributes describing inventory items. FIG. 3 shows inventory item attributes organized in inventory item records (318-340), each record representing an inventory item such as tea bags (record 318), peanut butter (record 320), mayonnaise (324), and so on. In addition to the RFID identification tag code field (306), the control value (308), an acceptable control value range ("ACRV") (312), and an out of range action ("OOR Action") (314) mentioned above, in the examples shown in FIG. 3, the inventory item records include fields for an item record identification code (302), a text description field (304), and an inventory date (316). The inventory date is an optional inclusion for use with inventory items sensitive to age. An additional optional inclusion, not shown, is a location field, useful with inventories large enough to have many storage locations for inventory items, large kitchens, warehouses with many storage bins or pallet shelves, and so on. Many other useful optional inclusions among inventory item attributes will occur to those of skill in the art, all such optional additional attributes being well within the scope of the present invention.

Figure 4:
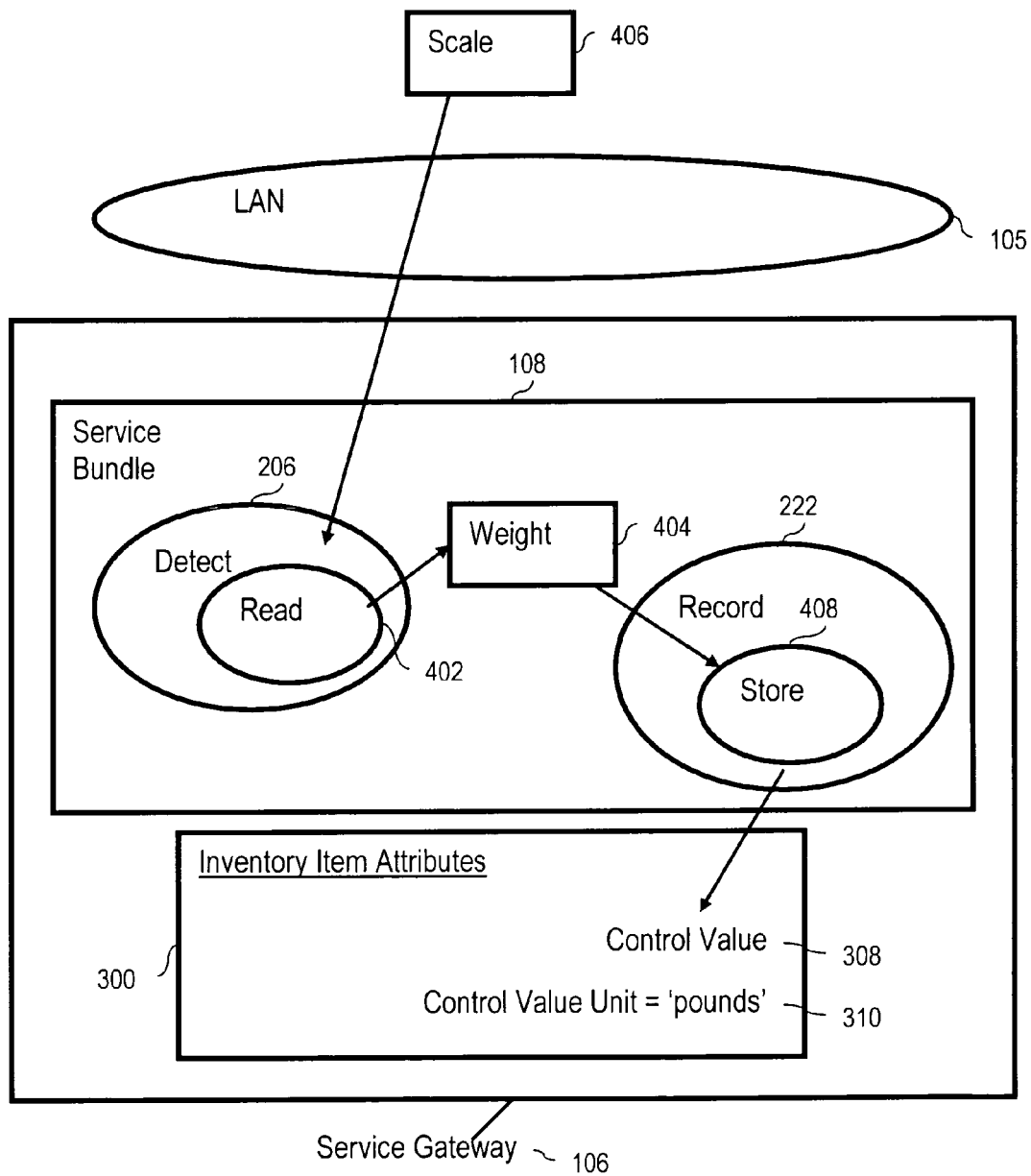
FIG. 4 is a control flow diagram of an exemplary embodiment utilizing a scale to weigh inventory items.

Turning to FIG. 4, a further example embodiment of the invention is disclosed in which the inventory item attributes (300) include a control value unit field (310) set to 'pounds'. In this example, detecting changes (206) in inventory item attributes includes reading (402) the weight (404) of the inventory item from a scale (406), and recording (222) detected changes comprises storing (408) the weight of the inventory item in the control value (308). FIG. 3 illustrates more specific examples of inventory item attributes for this kind of embodiment. Inventory item records (334-340) represent inventory items with control values measured in units of 'pounds,' the inventory items described respectively as "hamburger meat," "granola," "green beans," and "broccoli." In the particular case of hamburger meat (334), for example, the control value (308) shows that there is presently 0.8 pounds of hamburger meat in inventory. The OOR Action (312) for hamburger meat is set to 'reorder,' and the acceptable control value range is set from 0.5 pounds to 1.5 pounds, meaning that hamburger meat is reordered when its control value drops to less than 0.5 pounds.

Figure 5:
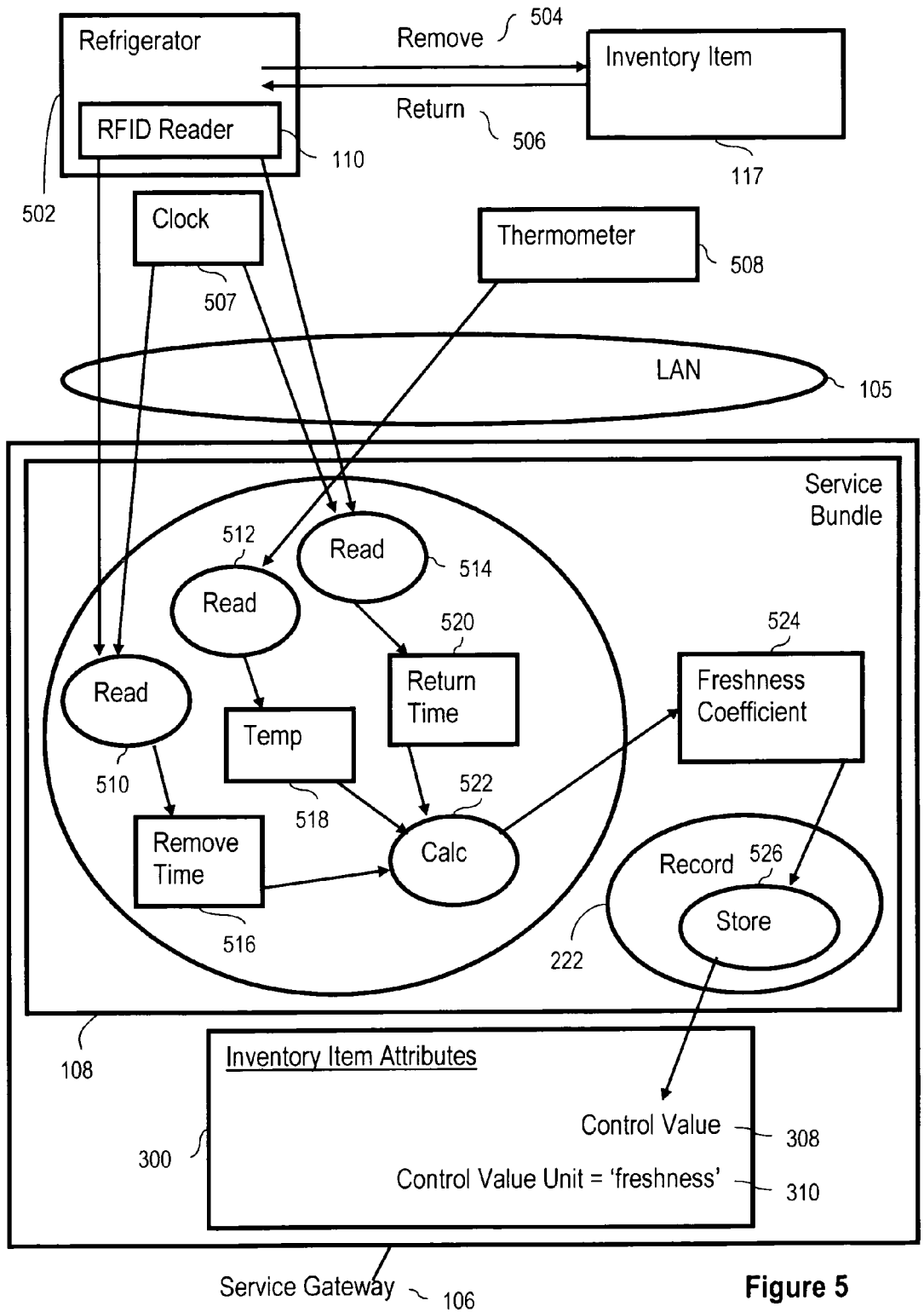
FIG. 5 is a control flow diagram of an exemplary embodiment utilizing a clock and a thermometer to calculate freshness of inventory items.

In FIG. 5, a still further example embodiment of the invention is illustrated in which the inventory item attributes (300) include a control value unit field (310) set to 'freshness'. In this example, detecting changes (206) in the inventory attributes of the inventory item includes reading (510) from a clock (507) the time (516) when the inventory item is removed (504) from a refrigerator (502), reading (512) the temperature (518) from a kitchen thermometer (508), reading (514) from the clock (507) the time (520) when the inventory item is returned (506) to the refrigerator (502), and calculating (522) a freshness coefficient (524) in dependence upon the time (516) when removed, the time (520) when returned, and the temperature (518). In this example, the control value represents a measure of freshness, and recording (222) detected changes includes storing (526) the freshness coefficient (524) in the control value (308).

FIG. 3 illustrates more specific examples of inventory item attributes for this kind of embodiment, with control value unit fields of 'freshness.' Inventory item records (320) and (330) represent inventory items with control values measured in units of 'freshness,' the inventory items described respectively as "peanut butter," and "milk." In the particular case of milk (330), for example, the control value (308) records a present freshness coefficient of '75.' The OOR Action (312) for milk is set to 'reorder,' and the acceptable control value range is set from 50 to 100, meaning that milk is reordered when its control value drops to less than a freshness coefficient of '50.'

Figure 6:
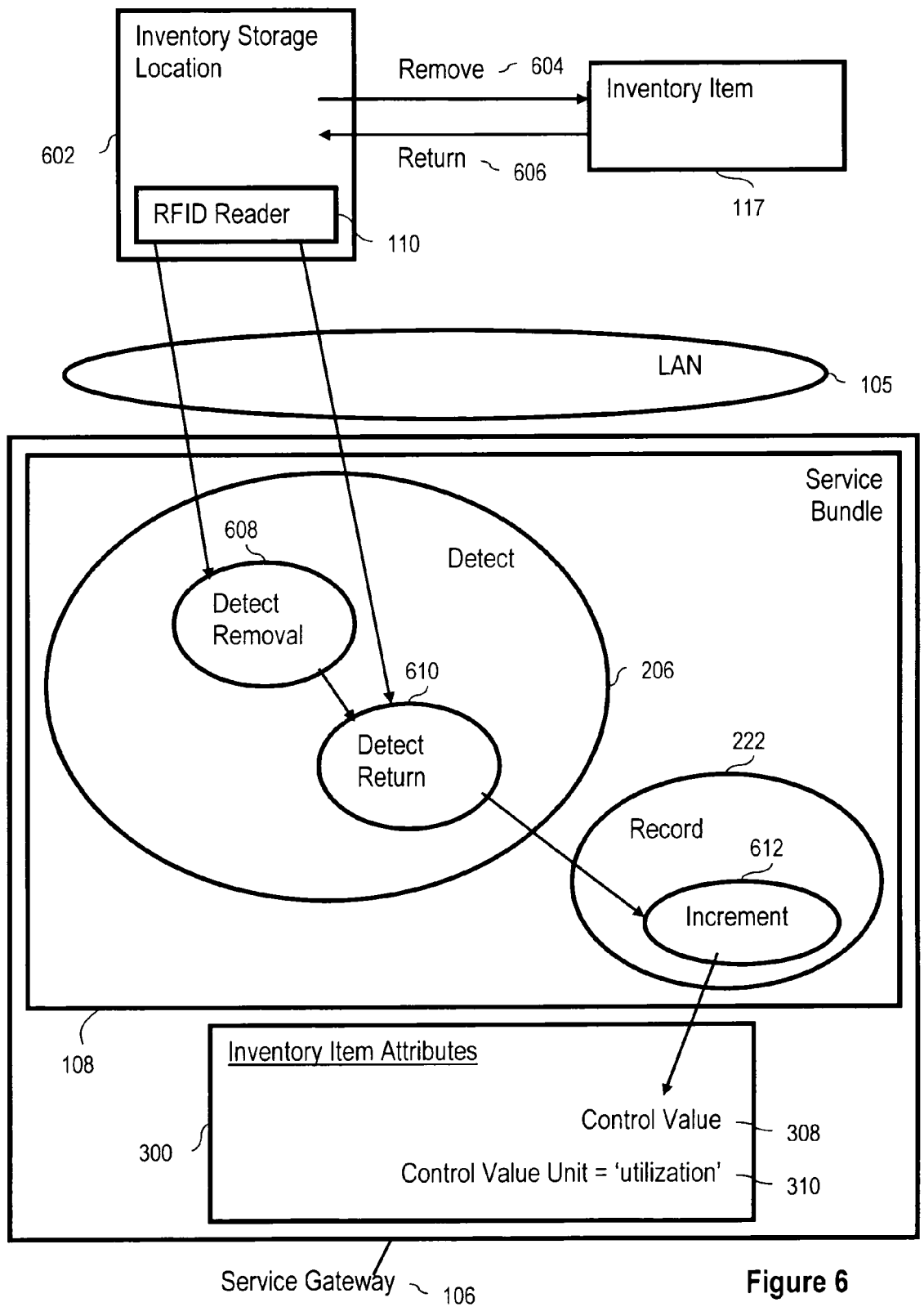
FIG. 6 is a control flow diagram of an exemplary embodiment utilizing an RFID reader to detect removals of inventory items.

Turning to FIG. 6, an even further example embodiment of the invention is illustrated wherein the inventory item attributes (300) include a control value unit field (310) set to 'utilization'. In this example, detecting changes (206) in the inventory attributes of the inventory item includes detecting (608, 610) that the inventory item has been removed from (608) and returned (610) to an inventory storage location (602). In this example, the control value represents the number of times the inventory item has been utilized, and recording (222) detected changes includes incrementing (612) the control value (308).

FIG. 3 illustrates a more specific example of inventory item attributes for this kind of embodiment, with control value unit fields of 'utilization.' Inventory item record (324) represents an inventory item with control values measured in units of 'utilization,' the inventory item described as "mayonnaise." In this particular case of mayonnaise (324), the control value (308) records a present utilization number of '10.' The OOR Action (312) for mayonnaise is set to 'reorder,' and the acceptable control value range is set from zero to 25 utilizations, meaning that mayonnaise is reordered when it has been utilized, taken in and out of the refrigerator, for example, more than 25 times.

Figure 7:
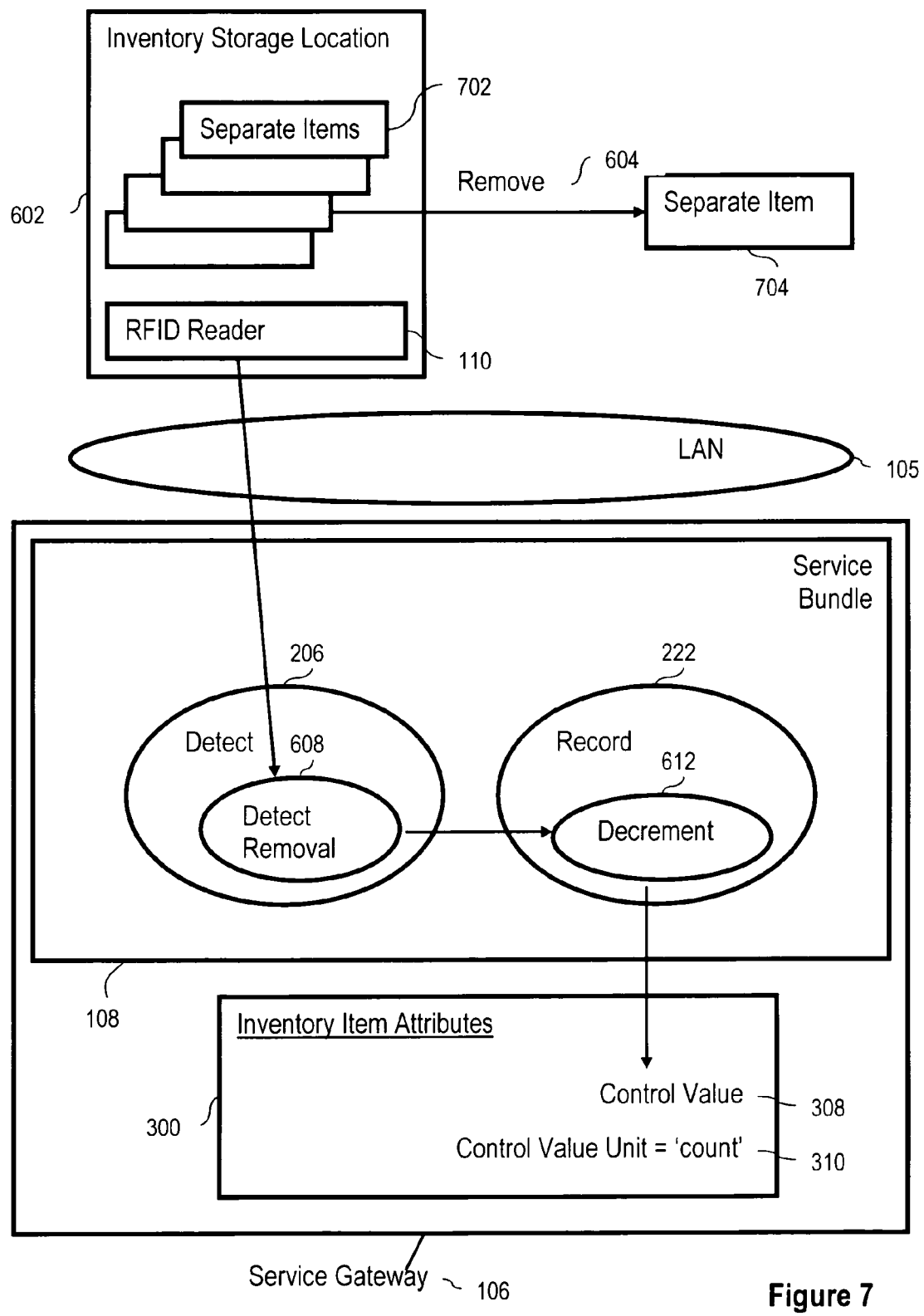
FIG. 7 is a control flow diagram of an exemplary embodiment utilizing an RFID reader to maintain a count of inventory items.

In FIG. 7, a further example embodiment of the invention is shown in which the inventory item (117) includes a quantity of separate items (702), and the inventory item attributes (300) further comprise a control value unit field (310) set to 'count'. In this example, detecting changes (206) in the inventory attributes includes detecting (608) that one of the separate items (704) has been removed (604) from inventory. In this example, the control value represents the quantity of separate items, and recording detected changes (222) includes decrementing (612) the control value (308).

FIG. 3 illustrates a more specific example of inventory item attributes for this kind of embodiment, with control value unit fields of 'count.' Inventory item record (318) represents an inventory item with control values measured in units of 'count,' the inventory item described as "tea bags." In this particular case of tea bags (318), the control value (308) records a count of '23.' The OOR Action (312) for tea bags is set to 'reorder,' and the acceptable control value range is set from 5 to 100, meaning that tea bags are reordered when the tea bag count drops below 5.

Figure 8:
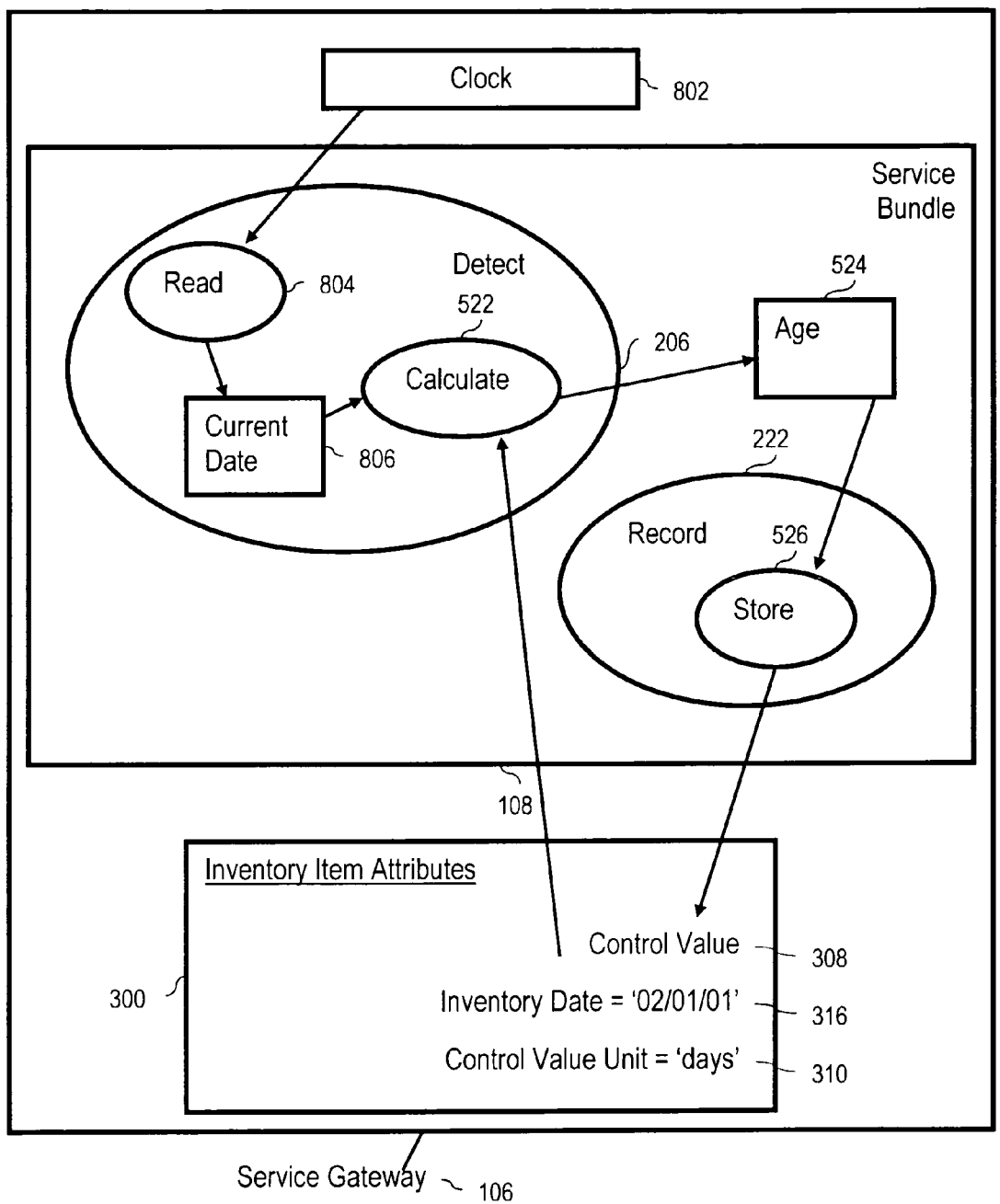
FIG. 8 is a control flow diagram of an exemplary embodiment utilizing a clock to calculate the age of inventory items.

Turning now to FIG. 8, a still further example embodiment of the invention is disclosed in which the inventory item attributes (300) include a control value unit field (310) set to 'days', and the inventory item attributes (300) further include an inventory date (316) representing the date when the inventory item entered inventory. In this example, detecting changes in inventory item attributes includes reading (804) from a clock the current date (806) and calculating (522) the age (524) of the inventory item in dependence upon the current date (806) and the inventory date (316). In this example, recording detected changes (222) includes storing (526) the age (524) of the inventory item in the control value (308).

FIG. 3 illustrates more specific examples of inventory item attributes for this kind of embodiment, with control value unit fields of 'days.' Inventory item records (326) and (328) represent inventory items with control values measured in units of 'days,' the inventory items described respectively as "leftover pot roast," and "bread." In the particular case of leftover pot roast (326), for example, the control value (308) records a present age of 3 days. The OOR Action (312) for leftover pot roast is set to 'discard,' and the acceptable control value range is set from zero to 7 days, meaning that leftover pot roast is discarded when its age exceeds 7 days.

Figure 11:
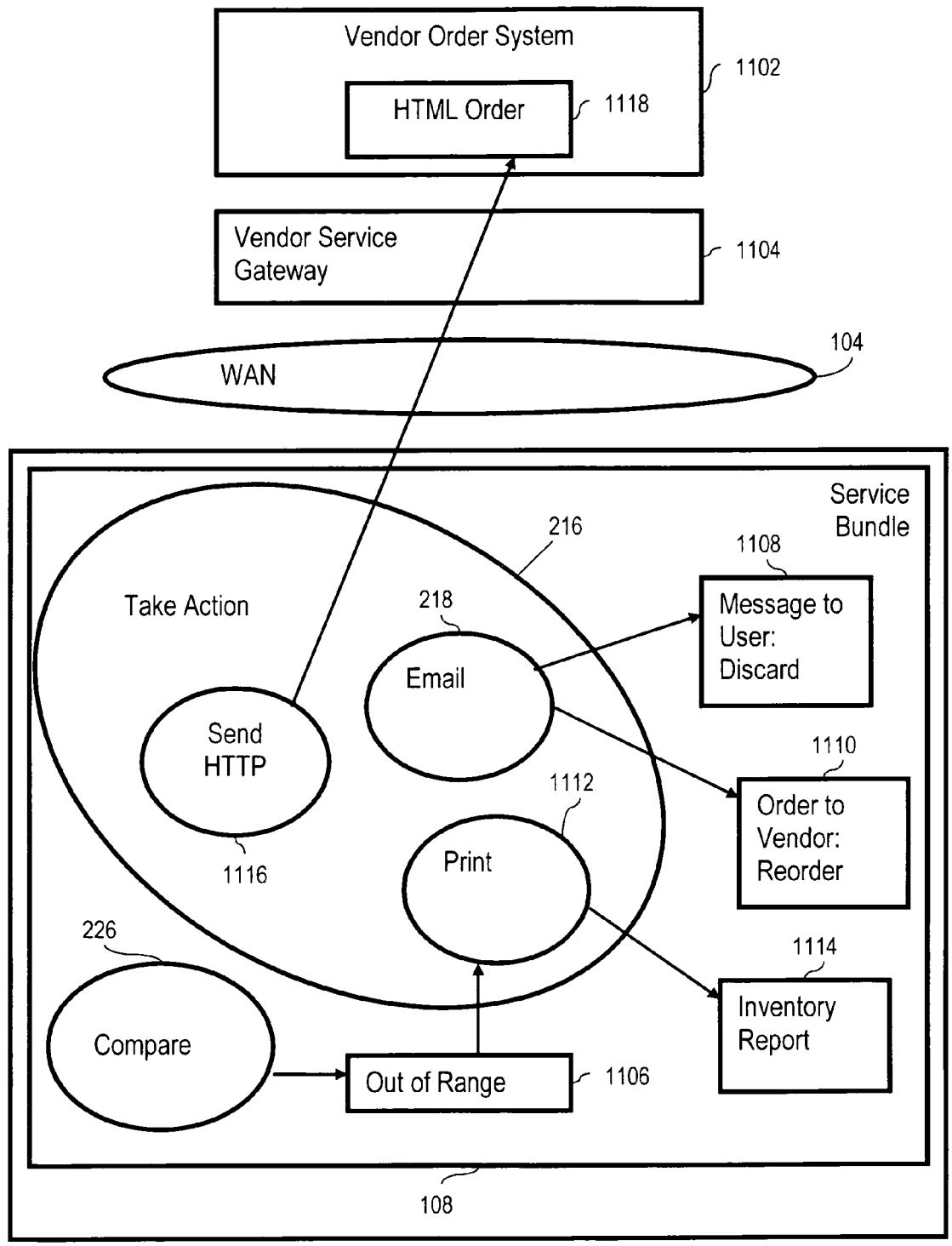
FIG. 11 is a control flow diagram illustrated alternative exemplary actions taken in dependence upon comparison results in various exemplary embodiments of the invention.

Turning now to FIG. 11, an even further example embodiment of the invention is disclosed in which taking action (216) includes emailing (218) an order (1110) to a vendor to reorder the inventory item when the results of the comparison step (226) shows that the control value is outside the acceptable control value range (1106). In some embodiments, taking action (216) includes emailing (218) a message (1108) to a user advising the user to discard the inventory item when the control value is outside the acceptable control value range (1106). In other example embodiments, taking action includes sending (1116), through HTTP and through a vendor service gateway (1104) directly to a vendor's online order system (1102), an HTML order (1118) for the inventory item when the control value is outside the acceptable control value range (1106).

Figure 10:
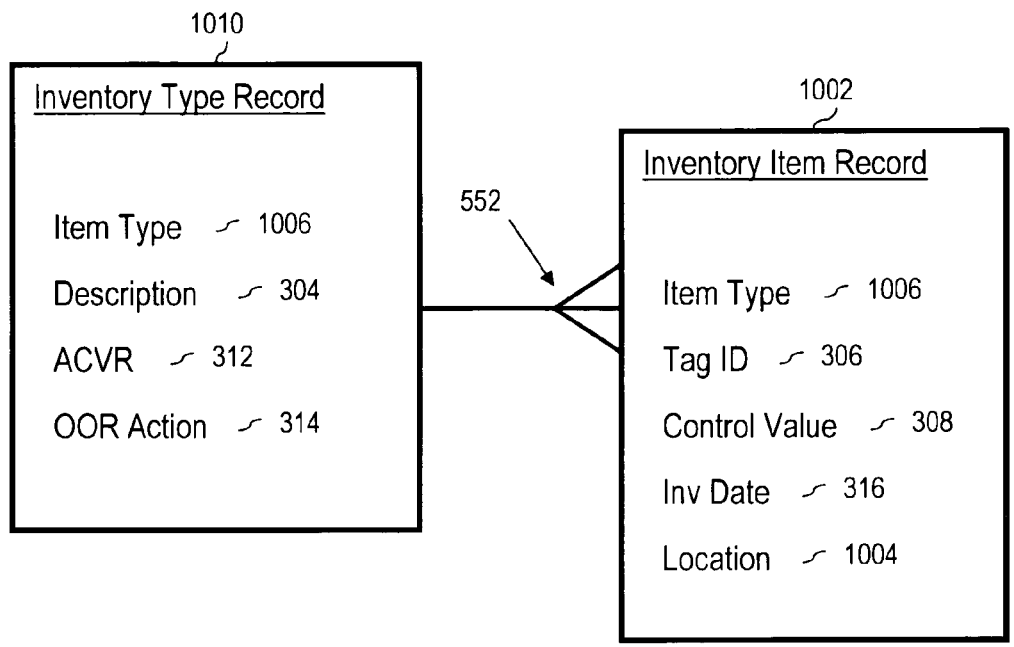
FIG. 10 is a database relationship diagram showing a one-to-many relationship among records representing inventory items and inventory item types, a relationship that is useful in various exemplary embodiments of the present invention.

Describing inventory item records having inventory item attributes as shown in FIG. 3, as done above in this specification, describes the inventory item records organized in a flat file. Persons of skill in the art will immediately recognize that alternative data structures are useful in many embodiments. One such alternative data structure is illustrated in FIG. 10 with inventory item records (1002) related in a one-to-many relationship (552), through a foreign key, in this case an inventory item type field (1006), to an inventory type record (1010). Such an alternative data structure is useful for embodiments in which there are many inventory items of one type in inventory, so that the information related to the type is stored only once in the type record instead of being stored many times in all the inventory item records. This illustrates one alternative data structure for storing inventory item attributes. In fact, many alternative data structures will occur those of skill in the art, and all such alternative data structures are well within the scope of the present invention.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method of inventory control comprising the steps of:
providing inventory item attributes comprising data elements in computer memory, wherein the inventory item attributes describe an inventory item, the inventory item has an RFID identification tag having an RFID identification tag code, and the inventory item attributes comprise:
an RFID identification tag code field,
a control value,
an acceptable control value range, and
an out of range action;
detecting changes in the inventory item attributes, wherein detecting changes in inventory item attributes includes reading, through an RFID reader, the RFID identification code from the RFID tag associated with the inventory item;
recording detected changes in inventory item attributes;
comparing the control value and the acceptable control value range; and
taking action in dependence upon the result of the comparing and the out of range action, wherein detecting changes, recording detected changes, comparing the control value and the acceptable control value range, and taking action are carried out through Java servlets in at least one Open Sources Gateway Initiative ('OSGI')-compliant service bundle installed and operating in an OSGI-compliant service gateway.

2. The method of claim 1 wherein:
the inventory item attributes further comprise a control value unit field set to 'pounds';
detecting changes includes reading the weight of the inventory item from a scale; and
recording detected changes comprises storing the weight of the inventory item in the control value.

3. The method of claim 1 wherein:
the inventory item attributes further comprise a control value unit field set to 'freshness';

detecting changes in the inventory attributes of the inventory item further comprises:
reading from a clock the time when the inventory item is removed from a refrigerator,
reading the temperature from a kitchen thermometer,
reading from the clock the time when the inventory item is returned to the refrigerator, and
calculating a freshness coefficient in dependence upon the time when removed, the time when returned, and the temperature; and
recording detected changes comprises storing the freshness coefficient in the control value.

4. The method of claim 1 wherein:
the inventory item attributes further comprise a control value unit field set to 'utilization';
detecting changes in the inventory attributes of the inventory item includes detecting that the inventory item has been removed from and returned to an inventory storage location; and
recording detected changes comprises incrementing the control value, wherein the control value represents the number of times the inventory item has been utilized.

5. The method of claim 1 wherein:
the inventory item comprises a quantity of separate items;
the inventory item attributes further comprise a control value unit field set to 'count';
detecting changes in the inventory attributes includes detecting that one of the separate items has been removed from inventory; and
recording detected changes comprises decrementing the control value, wherein the control value represents the quantity of separate items.

6. The method of claim 1 wherein:
the inventory item attributes further comprise:
a control value unit field set to 'days', and
an inventory date representing the date when the inventory item entered inventory;
detecting changes comprises:
reading from a clock the current date, and
calculating the age of the inventory item in dependence upon the current date and the inventory date; and
recording detected changes comprises storing the age of the inventory item in the control value.

7. The method of claim 1 wherein taking action comprises emailing an order to a vendor to reorder the inventory item when the control value is outside the acceptable control value range.

8. The method of claim 1 wherein taking action comprises emailing a message to a user advising the user to discard the inventory item when the control value is outside the acceptable control value range.

9. The method of claim 1 wherein taking action comprises sending, through HTTP and through a vendor service gateway directly to a vendor's online order system, an HTML order for the inventory item when the control value is outside the acceptable control value range.

* * * * *